(12) United States Patent
Abe

(10) Patent No.: US 9,929,382 B2
(45) Date of Patent: Mar. 27, 2018

(54) BATTERY HAVING A TAPERED HOUSING SPACE

(71) Applicant: Murata Manufacturing Co., Ltd., Nagaokakyo-shi, Kyoto-fu (JP)

(72) Inventor: Kazuhiro Abe, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 322 days.

(21) Appl. No.: 14/735,578

(22) Filed: Jun. 10, 2015

(65) Prior Publication Data

US 2015/0287962 A1 Oct. 8, 2015

Related U.S. Application Data

(63) Continuation of application No. PCT/JP2013/081130, filed on Nov. 19, 2013.

(30) Foreign Application Priority Data

Dec. 13, 2012 (JP) ................................ 2012-272295

(51) Int. Cl.
*H01M 2/02* (2006.01)
*H01M 10/04* (2006.01)
(Continued)

(52) U.S. Cl.
CPC ......... *H01M 2/0287* (2013.01); *H01M 2/026* (2013.01); *H01M 2/0212* (2013.01);
(Continued)

(58) Field of Classification Search
CPC .. H01M 2/0287; H01M 10/0436; H01M 2/16; H01M 2/1673; H01M 2/30;
(Continued)

(56) References Cited

U.S. PATENT DOCUMENTS

2005/0079757 A1* 4/2005 Watanabe ........... H01M 2/0277
439/500
2013/0224562 A1* 8/2013 Momo .............. H01M 10/0436
429/149

FOREIGN PATENT DOCUMENTS

JP    H10-208708 A    8/1998
JP    2000-077043 A    3/2000
(Continued)

OTHER PUBLICATIONS

International Search Report issued for PCT/JP2013/081130, dated Feb. 10, 2014.
Written Opinion of the International Searching Authority issued for PCT/JP2013/081130, dated Feb. 10, 2014.

*Primary Examiner* — Gary Harris
(74) *Attorney, Agent, or Firm* — Arent Fox LLP

(57) ABSTRACT

A battery having an exterior body defining a housing space which houses a battery element. The housing space is tapered in shape such that the plane area gradually becomes smaller from an opening toward the inside. A dimension of a top surface located innermost from the opening of the housing space is made equal to a smallest dimension among the positive electrode members, negative electrode members, and separators constituting the battery element. A dimension of the opening of the housing space is made equal to a largest dimension among the positive electrode members, negative electrode members, and separators constituting the battery element.

20 Claims, 6 Drawing Sheets

(51) Int. Cl.
*H01M 2/16* (2006.01)
*H01M 2/30* (2006.01)
*H01M 10/0525* (2010.01)
*H01M 10/0585* (2010.01)

(52) U.S. Cl.
CPC .......... *H01M 2/16* (2013.01); *H01M 2/1673* (2013.01); *H01M 2/30* (2013.01); *H01M 10/0436* (2013.01); *H01M 10/0525* (2013.01); *H01M 10/0585* (2013.01); *H01M 2002/0205* (2013.01); *H01M 2220/30* (2013.01)

(58) Field of Classification Search
CPC ............... H01M 2/0212; H01M 2/026; H01M 10/0525; H01M 10/0585; H01M 2002/0205; H01M 2220/30
USPC ........................................................ 429/179
See application file for complete search history.

(56) References Cited

FOREIGN PATENT DOCUMENTS

| | | |
|---|---|---|
| JP | 2000-208110 A | 7/2000 |
| JP | 2004-031194 A | 1/2004 |
| JP | 2004111219 A | 4/2004 |
| JP | 2005-116482 A | 4/2005 |
| JP | 2007-071133 A | 3/2007 |
| JP | 2007257952 A | 10/2007 |

\* cited by examiner

BATTERY HAVING A TAPERED HOUSING SPACE

CROSS REFERENCE TO RELATED APPLICATIONS

The present application is a continuation of International application No. PCT/JP2013/081130, filed Nov. 19, 2013, which claims priority to Japanese Patent Application No. 2012-272295, filed Dec. 13, 2012, the entire contents of each of which are incorporated herein by reference.

FIELD OF THE INVENTION

The present invention relates to a battery structured so that a battery element including a positive electrode member, a negative electrode member, a separator, and an electrolyte is housed in an exterior body formed with the use of a laminated sheet.

BACKGROUND OF THE INVENTION

In recent years, secondary batteries typified by lithium ion secondary batteries have been widely used as power sources for mobile electronic devices such as cellular phones and mobile personal computers.

Now, as this secondary battery (hereinafter, also simply referred to as a "battery"), a battery has been widely used which is structured to have a laminate of multiple positive electrode members and negative electrode members stacked with separators interposed therebetween, and an electrolyte (electrolytic solution) housed in an exterior body composed of laminated sheets, and have a positive electrode lead terminal and a negative electrode lead terminal electrically connected to the positive electrode members and the negative electrode members, which are extended outward from the exterior body.

One of such batteries is a battery 100 as shown in FIGS. 6(a) and 6(b) (see Patent Document 1).

This battery 100 has a battery element 101 housed in an exterior body (packing material) 103 composed of a laminated sheet 102, and has a structure with a lead terminal 104 extended outward from the exterior body 103.

Further, this battery 100 is formed by forming parts 102a of the laminated sheet 102 in advance in outwardly convex shapes as shown in FIG. 6(a), reducing the pressure in the battery (in the exterior body) for heat sealing, and then inwardly pressing the convex parts 102a at the atmospheric pressure, thereby causing inverse deformation as shown in FIG. 6(b).

The configuration of the battery is supposed to be less likely to increase the internal pressure, excellent in safety, and able to stabilize battery characteristics over a long period of time, because the inversely deformed parts of the exterior body function as buffers for preventing the increase in internal pressure due to gas generation, thereby preventing deformation, etc. of the exterior body.

However, when the gap between the exterior body and an electrode laminate housed within the exterior body is excessively increased, the inversely deformed parts are pressed at the atmospheric pressure to undergo deformation, thereby generating a large number of shrinkage wrinkles on the exterior body. Further, the shrinkage wrinkles have the problem of causing cracks or fractures on the exterior body (packing material) to be induced, thereby even leading to seriously damaged reliability.

Patent Document 1: Japanese Patent Application Laid-Open Publication No. 2007-71133

SUMMARY OF THE INVENTION

The present invention is intended to solve the problem described above, and an object of the present invention is to provide a battery structured to have a battery element housed in an exterior body composed of laminated sheets, which is able to suppress or prevent the generation of shrinkage wrinkles on the exterior body, excellent in safety, and able to stabilize battery characteristics over a long period of time.

In order to solve the problem mentioned above, the battery according to the present invention is a battery including:

a battery element including a laminate that has a positive electrode member and a negative electrode member opposed to each other with a separator interposed therebetween, and an electrolyte;

an exterior body comprising a laminated sheet having an outer protective layer made of a resin, an intermediate gas barrier layer made of a metal, and an inner adhesive layer made of a resin, and which defines a housing space with the battery element housed therein; and a positive electrode lead terminal electrically connected to the positive electrode member and a negative electrode lead terminal electrically connected to the negative electrode member, which are extended outward from the exterior body, characterized in that:

the housing space is formed by drawing the laminated sheet, and tapered such that the plane area gradually becomes smaller from an opening of the housing space toward the inside;

in the case of a top surface of the housing space, which is located innermost from the opening, in planar view, the dimension of the top surface is equal to a smallest dimension in the same direction among the positive electrode member, the negative electrode member, and the separator which constitute the laminate; and in the case of the opening of the housing space in planar view, the dimension of the opening is equal to a largest dimension in the same direction among the positive electrode member, the negative electrode member, and the separator which constitute the laminate.

In the present invention, the concept: "in the case of the top surface located innermost from the opening in planar view, the dimension of the top surface is equal to a smallest dimension in the same direction among the positive electrode member, the negative electrode member, and the separator which constitute the laminate" includes not only the dimensions exactly equal to each other, but also manufacturing tolerances.

Furthermore, the concept: "in the case of the opening in planar view, the dimension of the opening is equal to a largest dimension in the same direction among the positive electrode member, the negative electrode member, and the separator which constitute the laminate" also includes not only the dimensions exactly equal to each other, but also manufacturing tolerances.

Furthermore, in the battery according to the present invention, among the positive electrode member, the negative electrode member, and the separator which constitute the laminate, the member with the smallest dimension is preferably the positive electrode member.

As just described, among the positive electrode member, the negative electrode member, and the separator which constitute the laminate, the positive electrode member is preferably regarded as the member with the smallest dimension, because the effect of reducing concern about short circuit between positive and negative electrodes can be expected in such a way that makes lithium metal less likely to be deposited on the negative electrode in the case of charge.

Furthermore, it is also possible to be configured to include an exterior body that has a combined housing space formed by combining a pair of laminated sheets each with a housing space formed as defined in the battery according to the present invention, in such a manner that openings are opposed to each other, and house the laminate in the combined housing space.

The configuration described above makes it possible to increase the numbers of layers stacked for the laminate obtained by stacking the positive electrode member, the negative electrode member, and the separator, and makes it possible to provide an increase in battery capacity.

In the battery according to the present invention, the housing space of the exterior body (laminated packing material), with the battery element housed therein, is formed by drawing the laminated sheet, and tapered such that the plane area gradually becomes smaller from the opening toward the inside; in the case of a top surface of the housing space, which is located innermost from the opening, in planar view, the dimension is made equal to the dimension of the member with the smallest dimension in the same direction in the case of the positive electrode member, the negative electrode member, and the separator which constitute the laminate as viewed from the same direction; and in the case of the opening of the housing space in planar view, the dimension of the opening is made equal to a dimension of the member with the largest dimension in the same direction in the case of the positive electrode member, the negative electrode member, and the separator which constitute the laminate as viewed from the same direction. Thus, it becomes possible to suppress or prevent the generation of wrinkles due to deformation of the exterior body in such a way that no excess space will be produced between the laminate and the exterior body. As a result, it becomes possible to provide a highly reliable battery.

DETAILED DESCRIPTION OF THE INVENTION

With reference to embodiments of the present invention, features of the present invention will be described in more detail below.

Embodiment 1

Figure 1:
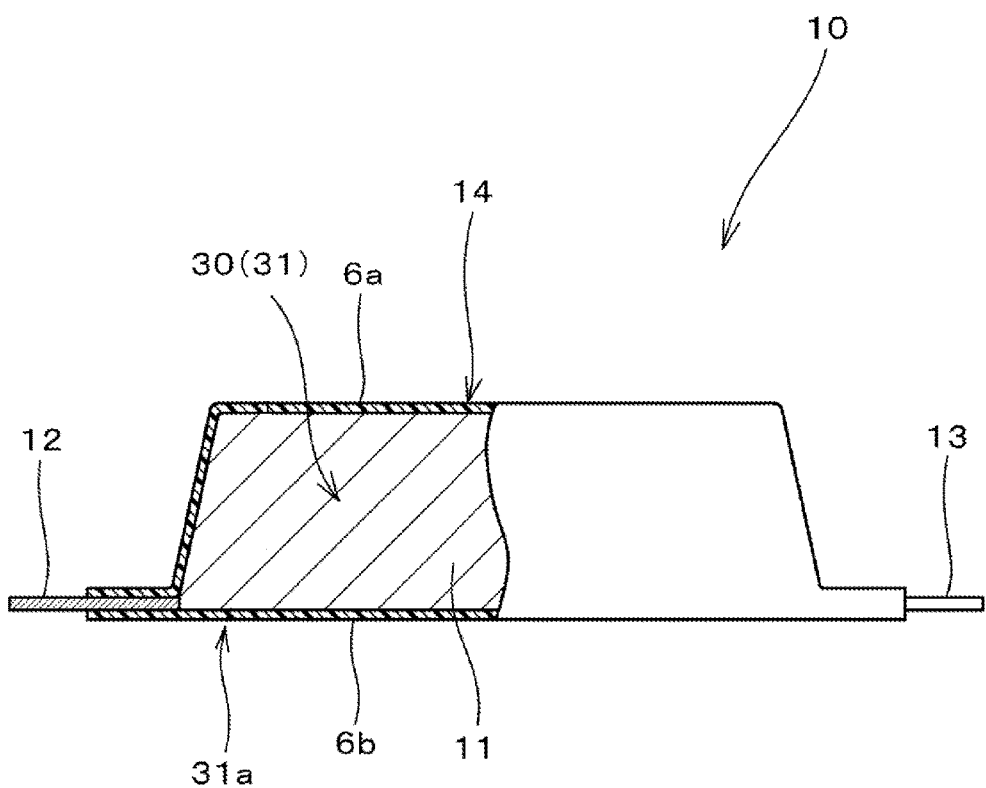
FIG. 1 is a front cross-sectional view of a major part, which schematically illustrates the configuration of a battery according to an embodiment (Embodiment 1) of the present invention.
Figure 2:
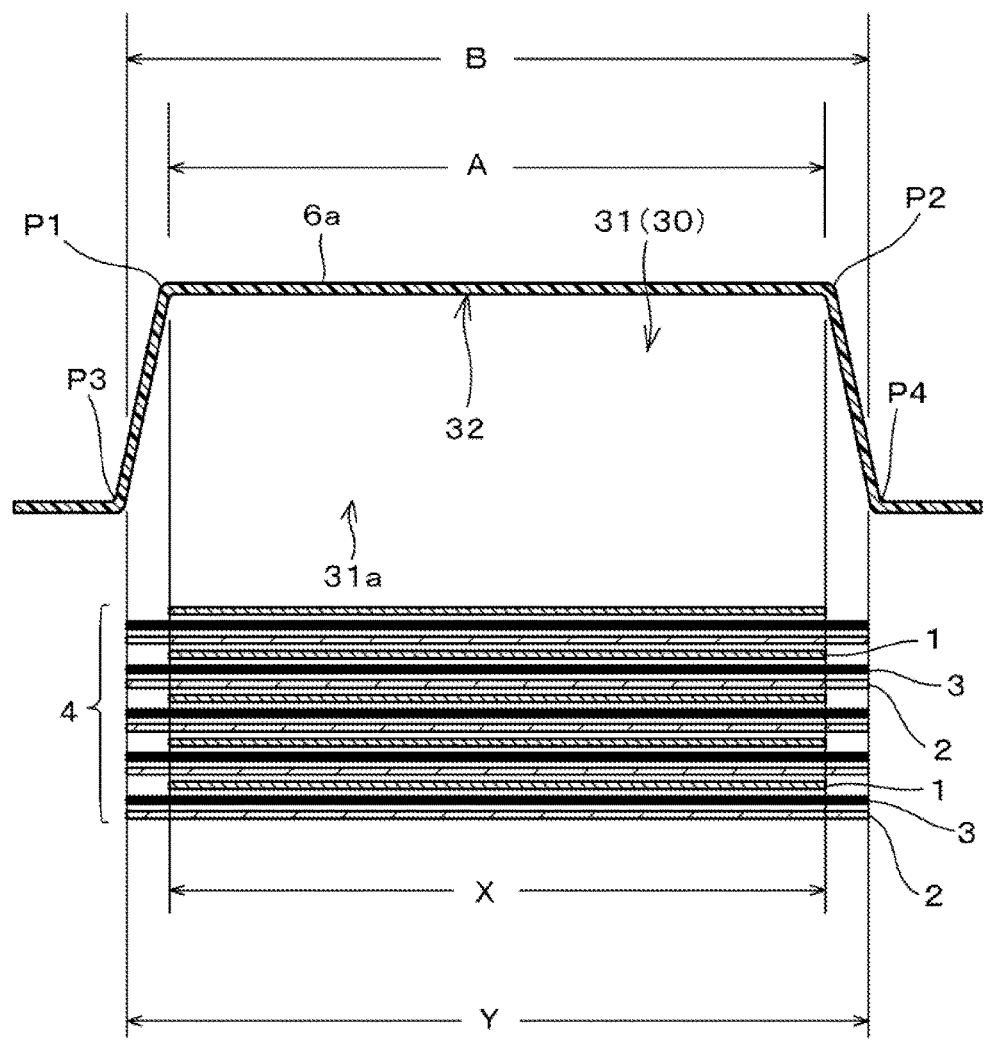
FIG. 2 is a diagram illustrating a state before housing a laminate of positive electrode members and negative electrode members stacked to be opposed to each other with separators interposed therebetween into a housing space of an external body, in manufacturing the battery according to Embodiment 1 of the present invention.
Figure 3:
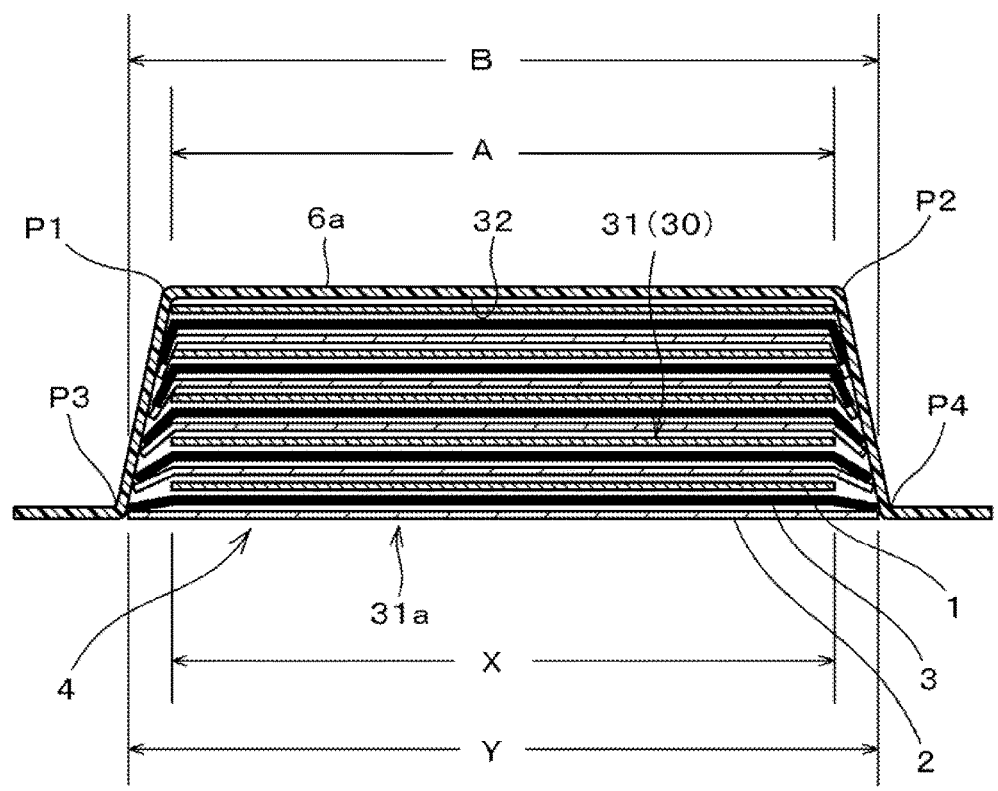
FIG. 3 is a diagram illustrating a state of the laminate housed in the housing space of the exterior body, in manufacturing the battery according to Embodiment 1 of the present invention.

FIG. 1 is a front cross-sectional view of a major part, which schematically illustrates the configuration of a battery (lithium ion secondary battery) according to an embodiment (Embodiment 1) of the present invention, FIG. 2 is a diagram illustrating a state before housing a laminate of positive electrode members and negative electrode members stacked to be opposed to each other with separators interposed therebetween into a housing space of an external body, and FIG. 3 is a diagram illustrating a state of the laminate housed in the housing space of the exterior body.

The battery 10 according to Embodiment 1 includes, as shown in FIGS. 1 to 3, an exterior body 14, a battery element 11 provided in the exterior body 14, and a positive electrode lead terminal 12 and a negative electrode lead terminal 13 that are extended from the exterior body 14.

Further, the battery element 11 includes, as shown in FIGS. 2 and 3, a laminate 4 of positive electrode members 1 and negative electrode members 2 stacked to be opposed to each other with separators 3 interposed therebetween, and an electrolytic solution (not shown) as an electrolyte.

Furthermore, the positive electrode lead terminal 12 and the negative electrode lead terminal 13 are electrically connected to the positive electrode members 1 and the negative electrode members 2 (see FIGS. 2 and 3), for example, with current collectors (not shown) interposed therebetween.

Figure 4:
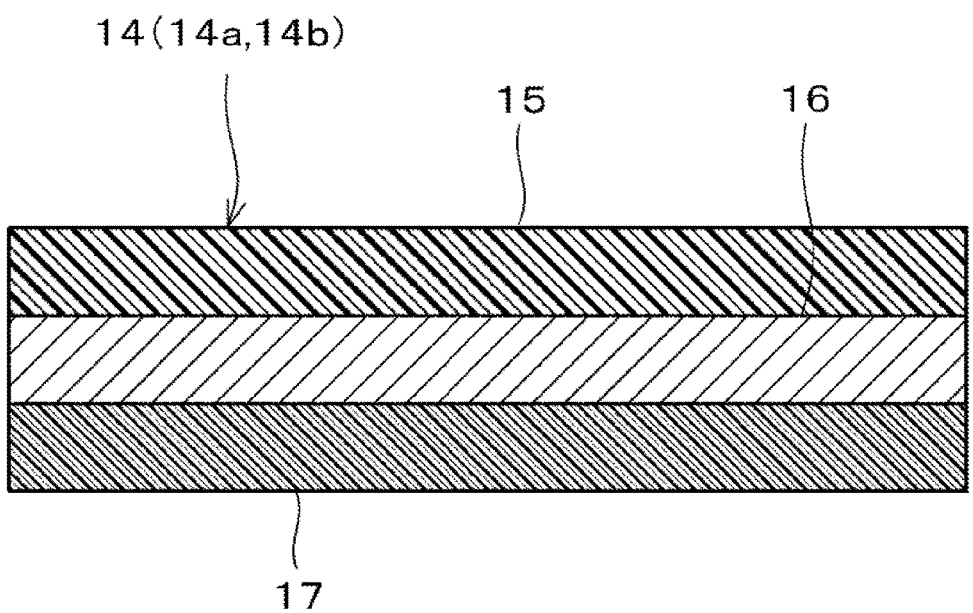
FIG. 4 is a diagram illustrating the configuration of a laminated sheet constituting the exterior body of the battery according to Embodiment 1 of the present invention.

In addition, the exterior body 14 with the battery element 11 housed therein is formed with the use of laminated sheets 6*a*, 6*b* combined by stacking, as shown in FIG. 4, an outer protective layer 15 made of a resin (a polyamide resin in Embodiment 1 herein), an intermediate gas barrier layer 16 made of a metal (aluminum in Embodiment 1 herein), and an inner adhesive layer 17 made of a resin (a polypropylene resin in Embodiment 1 herein) (FIG. 1).

More specifically, in the battery 10 according to Embodiment 1 herein, the exterior body 14 is formed with the used of the pair of laminated sheets 6*a*, 6*b*. In addition, one laminated sheet 6*a* constituting the exterior body 14 is provided with a concave part 31 which serves as a housing space 30 that houses the battery element 11, whereas a flat laminated sheet without any concave part provided is used as the other laminated sheet 6*b*.

In addition, the concave part 31 (=housing space 30) formed for the laminated sheet 6*a* is formed by drawing, and tapered such that the plane area gradually becomes smaller from an opening 31*a* toward the inside.

Furthermore, in the case of a top surface 32 of the concave part 31 (=housing space 30) in planar view, which is located innermost from the opening 31*a*, the dimension A of the top surface 32, that is, the distance (=dimension A) between folding points P1, P2 of the laminated sheet 6a as shown in FIGS. 2 and 3 is made equal to a dimension X of members with the smallest dimension in the same direction in the case of the positive electrode members 1, negative electrode members 2, and separators 3 constituting the laminate 4 as viewed from the same direction.

It is to be noted that among the positive electrode members 1, the negative electrode members 2, and the separators 3, the positive electrode members 1 are regarded as members with the smallest dimension A in FIG. 2 in Embodiment 1 herein.

Furthermore, in the case of the opening 31a of the concave part 31 (=housing space 30) in planar view, the dimension B of the opening 31a, that is, the distance (=dimension B) between folding points P3, P4 of the laminated sheet 6a as shown in FIG. 2 is made equal to a dimension Y of members with the largest dimension Y in the same direction in the case of the positive electrode members 1, negative electrode members 2, and separators 3 constituting the laminate 4 as viewed from the same direction.

It is to be noted that the negative electrode members 2 and the separators 3 are both regarded as members with the largest dimension Y in Embodiment 1 herein.

When the thus configured laminate 4 is housed in the concave part 31 formed for the laminated sheet 6a, among the positive electrode members 1, negative electrode members 2, and separators 3 constituting the laminate 4, the positive electrode members 1 are housed with both ends in a flat state without any flexion in a region of the concave part 31 (=housing space 30) from the top surface 32 to the opening 31a as shown in FIG. 3, because the dimension X of the positive electrode members is equal to the dimension A of the top surface 32 of the concave part 31 (=housing space 30) and smaller than the dimension B of the opening 31a.

On the other hand, the negative electrode members 2 and the separators 3 are housed in the concave part 31 (=housing space 30) with both ends (peripheral edges) flexed, because the dimension Y is equal to the dimension B of the opening 31a of the concave part 31 (=housing space 30) and larger than the dimension of the concave part 31 (=housing space 30) inside the opening.

In this case, each end (peripheral edge) of the negative electrode members 2 and separators 3 is gradually flexed depending on the degree of taper of the concave part 31 (=housing space 30), and the negative electrode members 2 and the separators 3 are housed in the concave part 31 (=housing space 30) in such a manner that no excess space will be produced between side surfaces (inner peripheral surfaces) of the concave part 31 (=housing space 30) and side surfaces of the laminate.

It is to be noted that the lowermost layer (the negative electrode member 2 in this embodiment) constituting the laminate 4 is housed without any flexion in the concave part 31 (=housing space 30), because the dimension Y is equal to the dimension B of the opening 31a.

Then, after the laminate 4 is housed in the concave part 31 (=housing apace 30), the laminated sheet 6b is placed on the lower side, and peripheral edges are brought together by, for example, a thermal welding method to seal the opening 31a. Thus, the battery 10 is obtained, whose structure is schematically shown in FIG. 1.

Further, the electrolyte (electrolytic solution) constituting the battery element 11 can be housed along with the laminate 4 in the housing space 30 by such a method as final sealing after injecting the electrolyte (electrolytic solution) into the housing space 30 sealed with a part thereof left unsealed, for example, when the laminated sheet 6b is brought to seal the opening 31a.

In the thus configured battery 10, as described above, each end (peripheral edge) of the negative electrode members 2 and separators 3 is gradually flexed depending on the degree of taper of the concave part 31 (=housing space 30), and the negative electrode members 2 and the separators 3 are housed in the concave part 31 (=housing space 30) in such a manner that no excess space will be produced between side surfaces (inner peripheral surfaces) of the concave part 31 (=housing space 30) and side surfaces of the laminate. Thus, it becomes possible to keep any substantial excess space from being produced between the laminate 4 and the exterior body 14.

As a result, it is suppressed or prevented that the exterior body 14 is deformed to generate wrinkles (shrinkage wrinkles), thereby making it possible to obtain a battery excellent in safety which is able to have battery characteristics stabilized over a long period of time.

Furthermore, among the positive electrode members 1, negative electrode members 2, and separators 3 constituting the laminate 4, the positive electrode members 1 are regarded as members with the smallest dimension, and it thus becomes possible to make the positive electrode capacity lower than the negative electrode capacity, thereby making lithium metal less likely to be deposited on the negative electrode in the case of charge.

Embodiment 2

Figure 5:
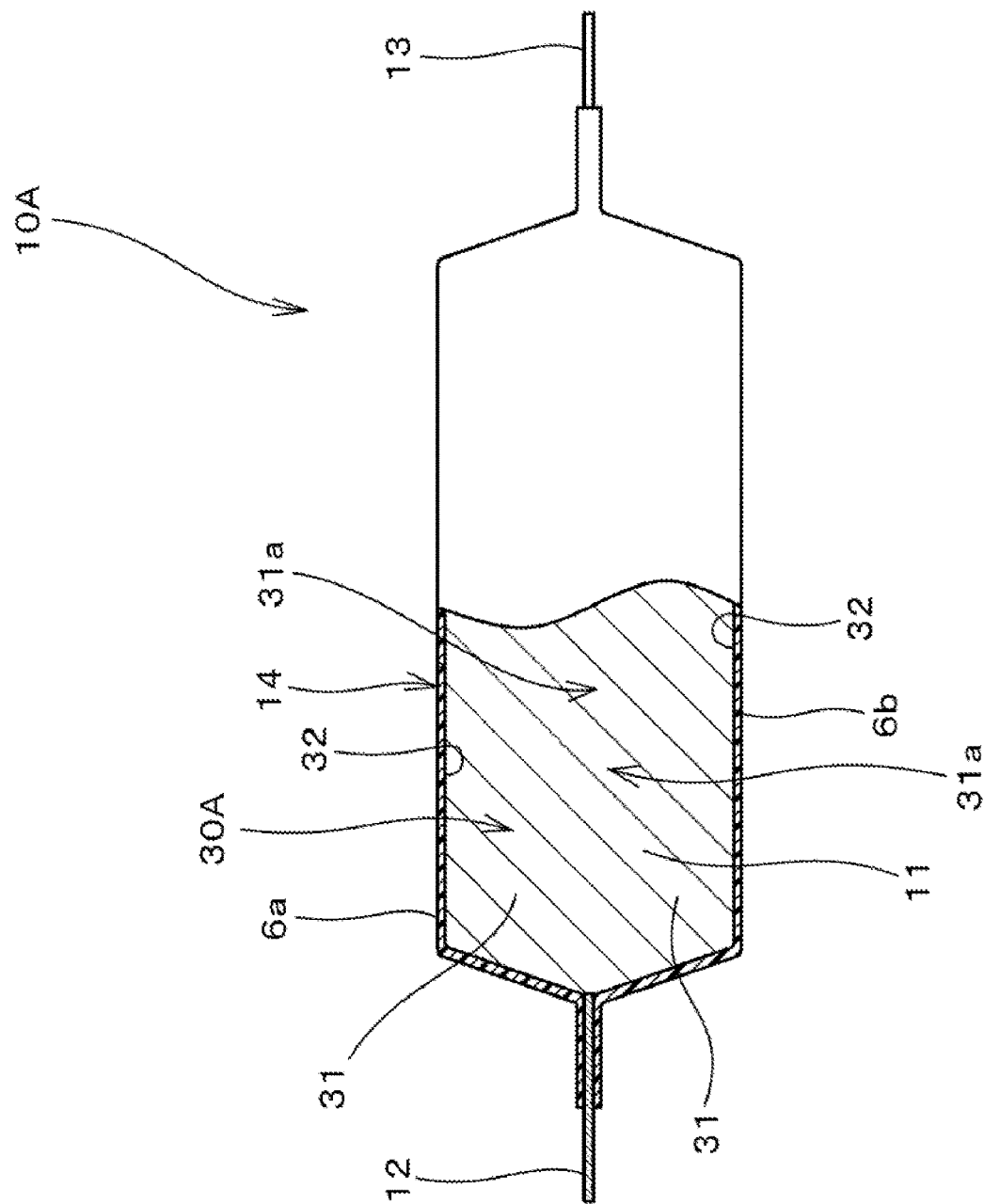
FIG. 5 is a front cross-sectional view of a major part, which schematically illustrates the configuration of a battery according to another embodiment (Embodiment 2) of the present invention.
Figure 6A:
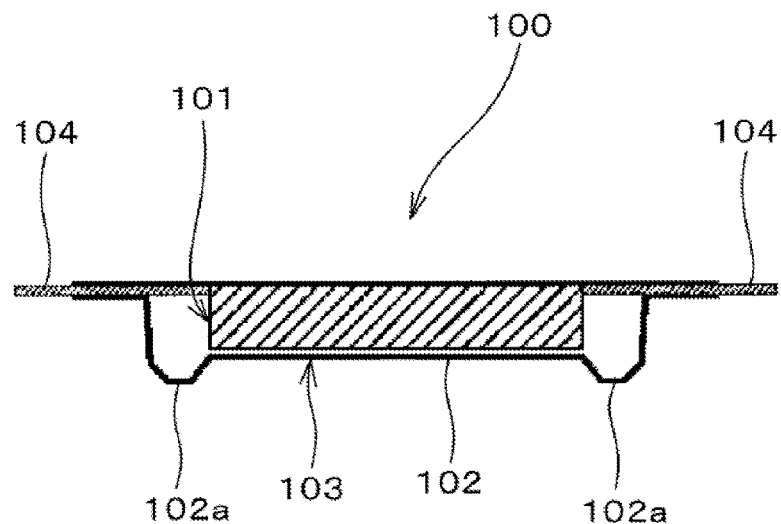
FIGS. 6(*a*) and 6(*b*) illustrate the configuration of a conventional battery, where FIG. 6(*a*) is a diagram illustrating an exterior body with convex parts before reducing the pressure within the battery (within the exterior body), whereas FIG. 6(*b*) is a diagram illustrating a state with the convex parts pressed inward at the atmospheric pressure to undergo inverse deformation.
Figure 6B:
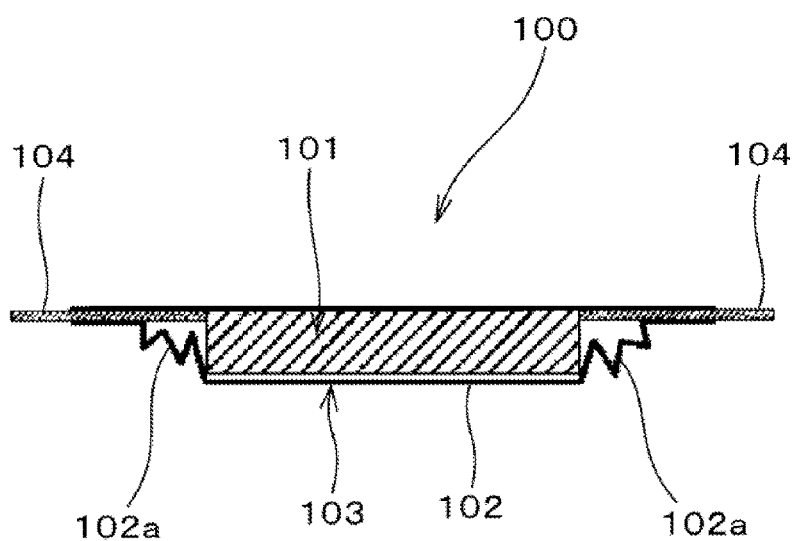

FIG. 5 is a diagram illustrating the configuration of a battery according to another embodiment (Embodiment 2) of the present invention.

A battery 10A according to Embodiment 2 herein has, as shown in FIG. 5, a pair of laminated sheets 6a, 6b constituting an exterior body 14, respectively with concave parts 31 formed to have a plane-symmetric shape, and these two concave parts 31 form a housing space (combined housing space) 30A.

In addition, the combined housing space 30A of the battery 10A according to Embodiment 2 is twice as large in dimension in the thickness direction as the housing space 30 according to Embodiment 1, and a laminate that is twice as large in the number of layers stacked as that in the case according to Embodiment 1 is housed along with an electrolyte (electrolytic solution) in the housing space 30A.

It is to be noted that in FIG. 5, the parts assigned with the same symbols as in FIG. 1 indicate the same or corresponding parts.

It is to be noted that the same relationships between the configuration of the convex part 31 formed for each of the laminated sheets 6a, 6b and the configuration of the laminate, that is, as described above in Embodiment 1, the same relationships (see FIGS. 2 and 3) among:

(a) the dimension A of a top surface 32;

(b) the dimension X of the smallest members among positive electrode members 1, negative electrode members 2, and separators 3;

(c) the dimension B of an opening 31a of the concave part 31 (=housing space 30); and (d) the dimension Y of the largest members among the positive electrode members 1, the negative electrode members 2, and the separators 3, are established as in the case of the battery according to Embodiment 1.

Also in the case of the battery according to Embodiment 2 herein, it becomes possible to keep any substantial excess space from being produced between the laminate and the exterior body, as in the case of the battery according to Embodiment 1 as described above. As a result, it is suppressed or prevented that the exterior body 14 is deformed to generate wrinkles (shrinkage wrinkles), thereby making it possible to obtain a battery excellent in safety which is able to have battery characteristics stabilized over a long period of time.

Furthermore, in the case of the battery according to Embodiment 2 herein, the same effects as in the case of the battery according to Embodiment 1 as described above can be also achieved in other respects.

It is to be noted that while the exterior body is formed by bringing together a pair of laminated sheets in Embodiments 1 and 2 as described above, it is also possible to form an exterior body by folding a laminated sheet and bringing together peripheral edges thereof to each other in such a way that adhesive layers are opposed to each other.

Further, while the outer protective layer 15 made of a polyamide resin, the intermediate gas barrier layer 16 made of aluminum, and the inner adhesive layer 17 made of a polypropylene resin, which are stacked and combined, are used as the laminated sheets 6a and 6b constituting the exterior body 14 in the respective embodiments described above, the laminated sheets which are able to be used in the present invention are not limited to these, but it is possible to use various laminated sheets including a protective layer (resin layer) which serves as an outer layer, a gas barrier layer (metal layer) which serves as an intermediate layer, and an adhesive layer (resin layer) which serves as an outer layer, when an exterior body is formed.

The present invention is not limited to the respective embodiments described above or modification examples yet in other respects, but various applications and modifications can be made within the scope of the invention, regarding the specific shape and configuration of the exterior body, in particular, the shape and size of the housing space, the specific configuration of the battery element, etc.

DESCRIPTION OF REFERENCE SYMBOLS 1 positive electrode member
2 negative electrode member
3 separator
4 laminate
6a, 6b laminated sheet
10, 10A battery
11 battery element
12 positive electrode lead terminal
13 negative electrode lead terminal
14 exterior body
15 outer protective layer (polyamide resin layer)
16 gas barrier layer (aluminum layer)
17 inner adhesive layer (polypropylene resin layer)
30 housing space
30A housing space (combined housing space)
31 concave part
31a opening of concave part
32 top surface of concave part
A dimension of top surface
B dimension of opening
X dimension of the smallest member among positive electrode member, negative electrode member, or separator
Y dimension of the largest member among positive electrode member, negative electrode member, or separator
P1, P2 top-surface folding points of laminated sheets
P3, P4 opening-side folding points of laminated sheets

The invention claimed is:

1. A battery including:
a battery element comprising a laminate including a positive electrode member and a negative electrode member opposed to each other with a separator interposed therebetween, and an electrolyte;
an exterior body defining a housing space that contains the battery element therein; and
a positive electrode lead terminal electrically connected to the positive electrode member and a negative electrode lead terminal electrically connected to the negative electrode member, the positive and negative electrode lead terminals extending outward from the exterior body,
wherein the housing space is tapered such that a plane area of the housing space decreases from an opening of the housing space inward toward a top surface of the housing space located innermost from the opening,
the top surface of the housing space, in a planar view thereof, has a first dimension equal to a smallest dimension in a same direction among the positive electrode member, the negative electrode member, and the separator; and
the opening of the housing space in the planar view has a second dimension equal to a largest dimension in the same direction among the positive electrode member, the negative electrode member, and the separator,
the positive electrode member, the negative electrode member, and the separator that has the smallest dimension in the same direction is contained within the housing space without bending at an edge thereof, and
the positive electrode member, the negative electrode member, and the separator that has the largest dimension in the same direction is contained within the housing space such that the edge thereof is bent, an amount of the bend at the edge being commensurate with a location of the edge along the taper of the housing space.

2. The battery according to claim 1, wherein the member with the smallest dimension is the positive electrode member.

3. The battery according to claim 2, wherein, when the laminate is housed in the housing space, the positive electrode member has opposed ends thereof in a state without any flexion.

4. The battery according to claim 1, wherein the member with the largest dimension is the negative electrode member.

5. The battery according to claim 4, wherein, when the laminate is housed in the housing space, the negative electrode member has both ends thereof in a flexed state.

6. The battery according to claim 1, wherein the member with the largest dimension is the separator.

7. The battery according to claim 6, wherein, when the laminate is housed in the housing space, the separator has both ends thereof in a flexed state.

8. The battery according to claim 1, wherein the member with the largest dimension is both the negative electrode member and the separator.

9. The battery according to claim 8, wherein, when the laminate is housed in the housing space, the negative electrode member and the separator have both respective ends thereof in a flexed state.

10. The battery according to claim 1, wherein the exterior body comprises a laminated sheet.

11. The battery according to claim 10, wherein the laminated sheet includes an outer protective layer, an intermediate gas barrier layer, and an inner adhesive layer.

12. The battery according to claim 11, wherein the outer protective layer comprises a resin, the intermediate gas barrier layer comprises a metal, and the inner adhesive layer comprises a resin.

13. The battery according to claim 1, wherein the exterior body is a first exterior body defining a first housing space, the battery further comprising a second exterior body defining a second housing space,
wherein the second housing space is tapered such that a plane area of the housing space decreases from an opening of the second housing space inward toward a top surface of the second housing space located innermost from the opening,
the top surface of the second housing space, in a planar view thereof, has a third dimension equal to the first dimension,
the opening of the second housing space in the planar view has a fourth dimension equal to the second dimension, and
a combined housing space formed by combining the first and second housing spaces in such a manner that the respective openings are opposed to each other houses the laminate.

14. The battery according to claim 13, wherein the member with the smallest dimension is the positive electrode member.

15. The battery according to claim 14, wherein, when the laminate is housed in the combined housing space, the positive electrode member has opposed ends thereof in a state without any flexion.

16. The battery according to claim 13, wherein the member with the largest dimension is both the negative electrode member and the separator.

17. The battery according to claim 16, wherein, when the laminate is housed in the combined housing space, the negative electrode member and the separator have both respective ends thereof in a flexed state.

18. The battery according to claim 13, wherein the first exterior body and the second exterior body each comprise a laminated sheet.

19. The battery according to claim 18, wherein the laminated sheet includes an outer protective layer, an intermediate gas barrier layer, and an inner adhesive layer.

20. The battery according to claim 19, wherein the outer protective layer comprises a resin, the intermediate gas barrier layer comprises a metal, and the inner adhesive layer comprises a resin.

* * * * *